US009766346B2

(12) United States Patent
Dunik et al.

(10) Patent No.: US 9,766,346 B2
(45) Date of Patent: Sep. 19, 2017

(54) MULTIPLE-CRITERION BASED GLOBAL NAVIGATION SATELLITE SUB-SET RECURSIVE SELECTION

(71) Applicant: Honeywell International Inc., Morristown, NJ (US)

(72) Inventors: Jindrich Dunik, Plzen (CZ); Martin Orejas, Brno (CZ); Zdenek Kana, Dubnany (CZ)

(73) Assignee: Honeywell International Inc., Morris Plains, NJ (US)

( * ) Notice: Subject to any disclaimer, the term of this patent is extended or adjusted under 35 U.S.C. 154(b) by 894 days.

(21) Appl. No.: 14/091,441

(22) Filed: Nov. 27, 2013

(65) Prior Publication Data

US 2015/0145719 A1 May 28, 2015

(51) Int. Cl.
*G01S 19/28* (2010.01)
*G01S 19/39* (2010.01)

(52) U.S. Cl.
CPC .............. *G01S 19/28* (2013.01); *G01S 19/39* (2013.01)

(58) Field of Classification Search
CPC .................................. G01S 19/28; G01S 19/36
See application file for complete search history.

(56) References Cited

U.S. PATENT DOCUMENTS

| 7,783,425 | B1 | 8/2010 | Hwang et al. | |
|---|---|---|---|---|
| 8,106,823 | B2 | 1/2012 | Schroth | |
| 2013/0342396 | A1* | 12/2013 | O'Connor | G01S 19/05 342/357.42 |

FOREIGN PATENT DOCUMENTS

DE 102007006612 8/2008

OTHER PUBLICATIONS

European Patent Office, "Extended European Search Report for Application No. 14191182.6", "from Foreign Counterpart to U.S. Appl. No. 14/091,441", May 13, 2015, pp. 1-5, Published in: EP.
Liu et al., "A Recursive Quasi-Optimal Fast Satellite Selection Method for GNSS Receivers", "22nd International Meeting of the Satellite Division of the Institute of Navigation", Sep. 22-25, 2009, Published in: Savannah, GA.
Blanch et al., "An Optimized Multiple Hypothesis RAIM Algorithm for Vertical Guidance", "Proceedings of the 20th International Technical Meeting of the Satellite Division of the Institute of Navigation", Sep. 2007, pp. 2924-2933.

(Continued)

*Primary Examiner* — Cassie Galt
(74) *Attorney, Agent, or Firm* — Fogg & Powers LLC

(57) ABSTRACT

In one embodiment, a method for selecting a sub-set of satellites from a set of N satellites is provided. The method includes recursively evaluating each sub-set of N−P satellites of a set of N satellites. If only one sub-set satisfies one or more first criterion, then the one sub-set that satisfies the one or more first criterions is selected. If, however, more than one sub-set satisfies the one or more first criterion, then the sub-sets that satisfy the one or more first criterion are evaluated with respect to one or more second criterion and the one sub-set that optimizes the one or more second criterion is selected. Once the selected set of N satellites is equal to the number of satellites from which a receiver is configured to calculate a navigation solution, then that selected set of N satellites is used to calculate a navigation solution.

20 Claims, 3 Drawing Sheets

(56) References Cited

OTHER PUBLICATIONS

Jiang et al., "Optimization of the Multiple Hypotheses Solution Spearation Raim Method", "Proceedings of the 25th Int. Tech. Meeting of the Satellite Division of the U.S. Inst. of Navigation", Sep. 18-21, 2012, pp. 228-234, Published in: US.
Liu et al., "A Recursive Quasi-optimal Fast Satellite Selection Method for GNSS Receivers", 2009, pp. 1-11, Publisher: School of Information and Electronics, Beijing Institute of Technology.

\* cited by examiner

MULTIPLE-CRITERION BASED GLOBAL NAVIGATION SATELLITE SUB-SET RECURSIVE SELECTION

BACKGROUND

A satellite navigation system is a satellite based radio-navigation system in which a plurality of satellites orbit the earth and broadcast information that can be used by receivers to determine a position relative to the satellites. Example satellite navigation systems include the global positioning system (GPS), the GLONASS system, the COMPASS system, and the Galileo positioning system.

A satellite navigation system receiver (also referred to herein as simply "receiver") can determine a navigation solution (e.g., position and/or velocity) based on pseudoranges to a plurality of navigation satellites. A pseudorange can be determined based on the time it takes for a signal to propagate from a navigation satellite to the receiver and the position of the satellite when it transmitted the signal. For each satellite visible to the receiver, a pseudorange can be calculated. Once the receiver has determined the distances (pseudoranges) between itself and multiple satellites, the receiver can calculate a position by triangulation using the known location of the multiple satellites. The precision of the location calculation increases as more satellites from which a pseudorange can be calculated increases. Due to limited processing capabilities, however, many receivers are limited to calculating a location based on a maximum number of satellites. For example, a receiver may be limited to calculating a location based on 5 satellites. Oftentimes, however, more than 5 satellites are visible to the receiver. Accordingly, such receivers are configured to select a sub-set of the visible satellites to use when calculating a location.

In some examples, such a receiver determines which sub-set of satellites is the best to use based on the geometrical dilution of precision (GDOP) in each dimension of the receiver measurement. The GDOP is related to the relative position of the satellites. When the satellites are close together, the geometry is said to be weak and the geometrical dilution of precision (GDOP) is said to be high; when the satellites are far apart and rather equidistantly spaced, the geometry is said to be strong and the GDOP is said to be low. In order to select the sub-set with the lowest GDOP, the receiver will go through each possible grouping of sub-sets among the visible satellites.

SUMMARY

In one embodiment, a method for selecting a sub-set of satellites from a set of N satellites is provided. The method includes setting either an initial set of N satellites or a reduced set of N satellites as a current set of N satellites and recursively evaluating each sub-set of N–P satellites of the current set of N satellites with respect to one or more criterion. If only one sub-set satisfies one or more first criterion, then the one sub-set that satisfies the one or more first criterions is selected as the reduced set of N satellites. If, however, more than one sub-set satisfies the one or more first criterion, then the sub-sets that satisfy the one or more first criterion are evaluated with respect to one or more second criterion and the one sub-set that optimizes the one or more second criterion is selected as the reduced set of N satellites. Once the reduced set of N satellites is equal to the number of satellites from which a receiver is configured to calculate a navigation solution, then that reduced set of N satellites is used to calculate a navigation solution.

DRAWINGS

The drawings depict only exemplary embodiments and are not therefore to be considered limiting in scope. The exemplary embodiments will be described with additional specificity and detail through the use of accompanying drawings.

In accordance with common practice, the various described features are not drawn to scale but are drawn to emphasize specific features relevant to the exemplary embodiments.

DETAILED DESCRIPTION

The embodiments described below can relate to selecting a sub-set of satellites from a set of satellites visible to a global navigation satellite system (GNSS) receiver and calculating a navigation solution using the selected sub-set of satellites. These systems and methods can be used to reduce the number of tracking channels and required computation power needed by a global navigation satellite system receiver.

Figure 1:
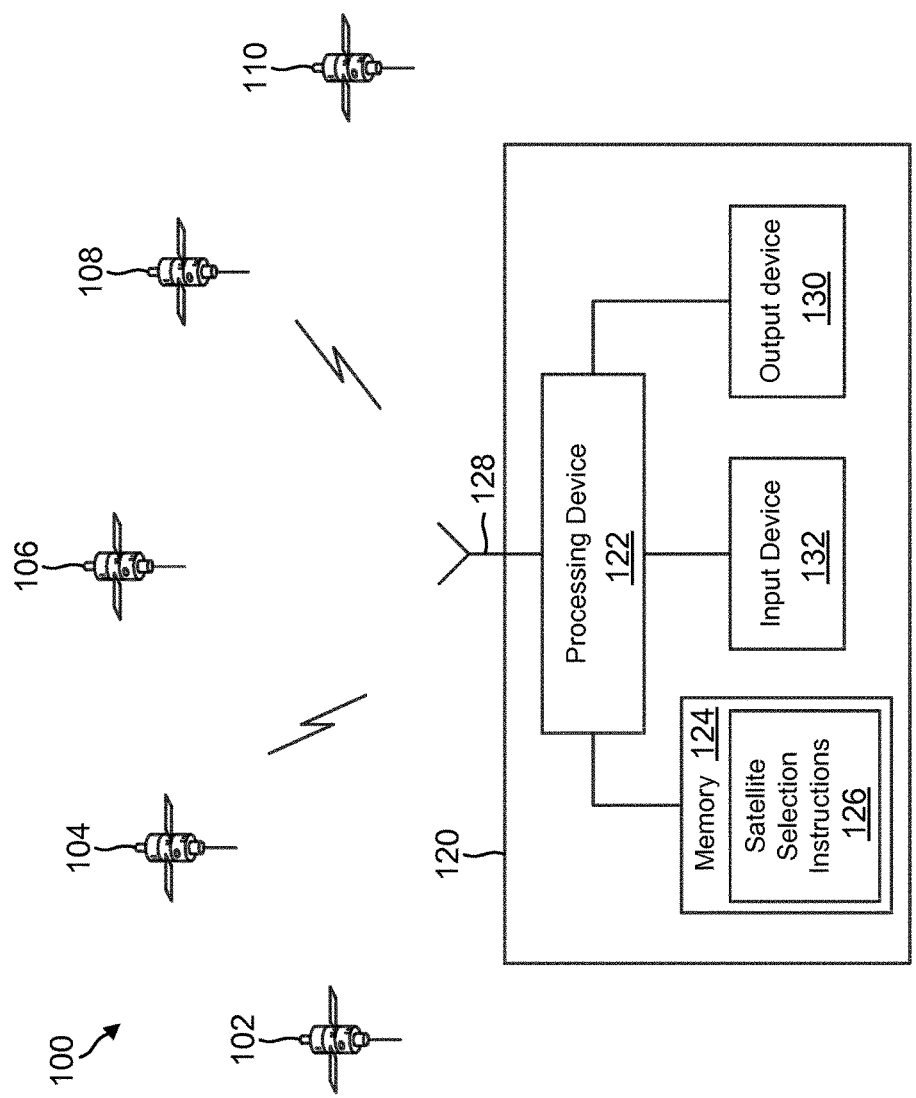
FIG. 1 is a block diagram of an example satellite navigation system receiver.

FIG. 1 is a block diagram of an example of a satellite navigation system 100. The satellite navigation system 100 includes a plurality of satellites 102-110 and one or more receivers 120. The satellites 102-110 can transmit signals for reception by the receivers 120. The receiver 120 can receive a signal from one or more of the satellites 102-110 and calculate a navigation solution (e.g., position and/or velocity) based on the signals. Example satellite navigation systems 100 include the global positioning system (GPS), the GLONASS system, COMPASS, and the Galileo positioning system.

The receiver 120 can include one or more processing devices 122 coupled to one or more memory devices 124. The one or more memory devices 124 can include instructions 126 which, when executed by the one or more processing devices 122, can cause the one or more processing devices 122 to perform one or more acts, such as the acts described with respect to FIG. 2 and FIG. 3 below. As used herein, the receiver 120 is configured to perform a function when the memory 124 includes instructions 126 which, when executed by the processing devices 122, cause the processing device 122 to perform the function.

In an example, the one or more processing devices 122 can include a central processing unit (CPU), microcontroller, microprocessor (e.g., a digital signal processor (DSP)), field programmable gate array (FPGA), application specific integrated circuit (ASIC), or other processing device. The one or more memory devices 124 can include any appropriate processor readable medium used for storage of processor readable instructions or data structures. Suitable processor readable media can include tangible media such as magnetic or optical media. For example, tangible media can include a conventional hard disk, compact disk (e.g., read only or re-writable), volatile or non-volatile media such as random access memory (RAM) including, but not limited to, synchronous dynamic random access memory (SDRAM), double data rate (DDR) RAM, RAMBUS dynamic RAM (RDRAM), static RAM (SRAM), etc.), read only memory (ROM), electrically erasable programmable ROM (EEPROM), and flash memory, etc. Suitable processor-readable media can also include transmission media such as electrical, electromagnetic, and digital signals, conveyed via a communication medium such as a network and/or a wireless link. Moreover, it should be understood that the processor readable media can be integrated into the receiver 120 as in, for example, RAM, or can be a separate item to which access can be provided to the receiver 120 as in, for example, portable media such as a compact disk or flash drive.

The receiver 120 can also include an antenna 128 coupled to the processing device 122 and configured to sense signals from the satellites 102-110. In an example, the receiver 120 can include one or more output devices 130 to provide information to a user. The output device 130 can include a display, a speaker, a haptic feedback generator, a light, and other output mechanisms. In an example, the receiver 120 can include one or more input devices 132. The input device 132 can include a keyboard, mouse, touch sensors, voice sensor, and other input mechanisms. In an example, the receiver 120 can be integrated into a larger device such as, for example, an aircraft.

Figure 2:
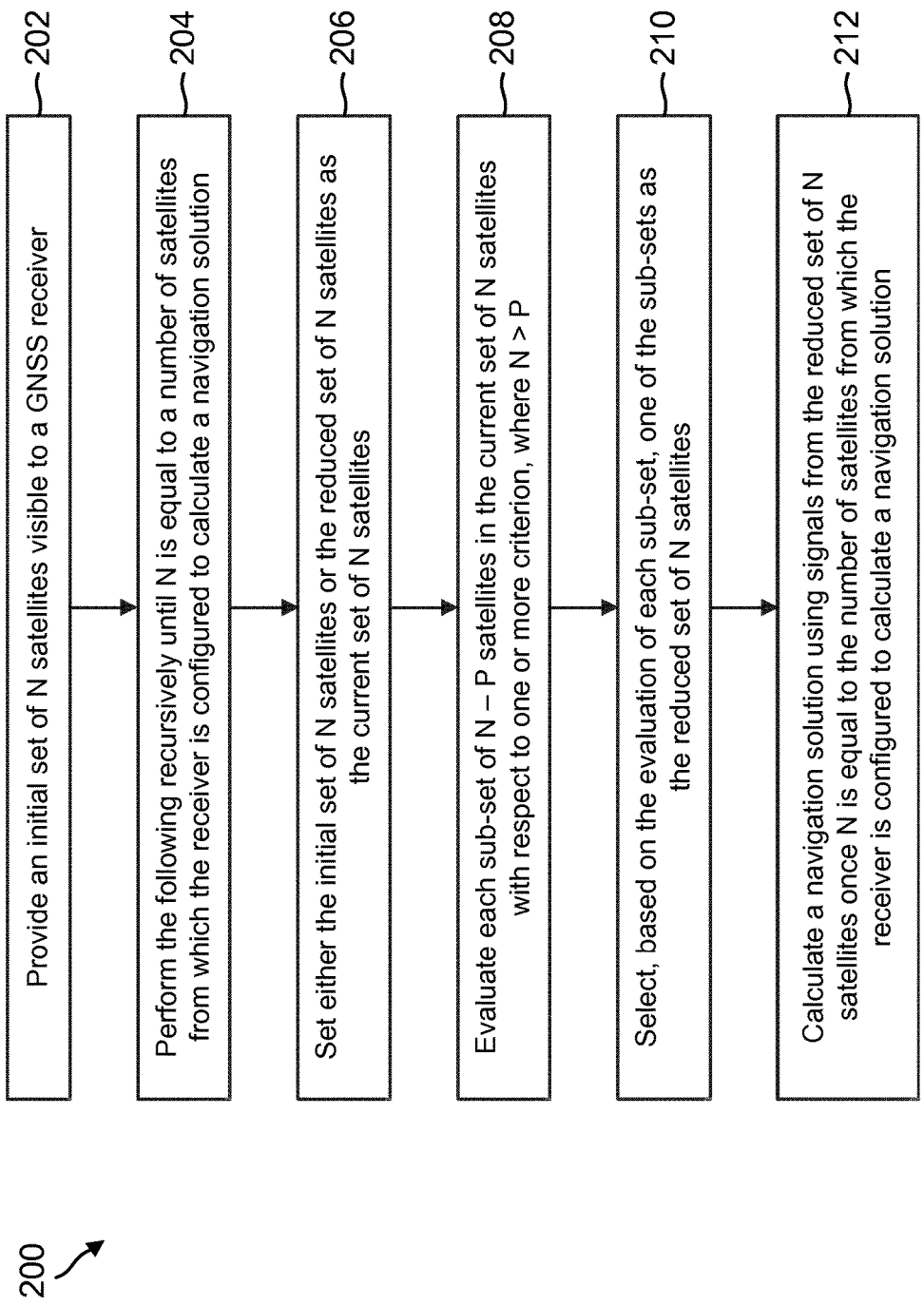
FIG. 2 is a flow diagram of an example of a method for satellite selection from a set of satellites in a navigation system.

FIG. 2 is a flow diagram of a method 200 for selecting a sub-set of satellites from a set of satellites visible to a receiver 120 based on one or more criterion, and calculating a navigation solution using the selected sub-set of satellites. The method 200 includes receiving a plurality of signals (block 202) from a set of N satellites 102-110 visible to a receiver 120, then recursively reducing the number (N) of satellites in the set (blocks 204-210). That is, the number of satellites in the set of N satellites is reduced by discarding one or more satellites from the set of N satellites. When block 210 is reached, the method proceeds back to block 204 to perform blocks 206-210 again, this time with the reduced set of N satellites (that is, the set of N satellites from the last loop reduced by the one or more satellites discarded in the last loop). Accordingly, each successive loop of blocks 206-210 operates on a smaller number (N) of satellites than the previous loop of blocks 206-210. In this way, the number (N) of satellites in the set is incrementally reduced through successive calls of blocks 206-210. Once N is reduced to the number of satellites from which the receiver 120 is configured to calculate a navigation solution, a navigation solution is determined using the remaining sub-set of N satellites. In an example, the method 200 can have a set frequency. The frequency can be either a predefined frequency (equidistant time instants) or in unequally distributed time instants which are determined by one or more conditions. In an example, a condition can be when one of the thresholds discussed below under block 208 is close to being exceeded. In another example, a condition can be when one of the thresholds discussed below under block 208 is fast approaching. In another example, the method 200 can be performed after a receiver 120 is initialized. In another example, the method 200 can be performed when a satellite that was being utilized by a receiver 120 is no longer visible to the receiver 120, since the set of all visible satellites for the receiver 120 has changed. Similarly, in another example, the method 200 can be performed when a satellite that was not previously visible to a receiver 120 becomes visible to the receiver 120. In another example, the method 200 can be performed by a receiver 120 onboard an aircraft during different stages of the aircraft's flight, such as when the aircraft is departing or landing.

To implement the method 200, an initial set of N satellites is selected from the set of satellites 102-110 visible to a receiver 120. A satellite is visible to a receiver 120 if, at the present time and at the present location of the receiver 120, the receiver 120 is able to receive a signal from that satellite. Accordingly, the set of satellites visible to a receiver 120 will change based on the time and location of the receiver 120. As an example, the initial set of N satellites can include all satellites 102-110 visible to the receiver 120. In another example, the initial set of N satellites can be a subset of all satellites 102-110 visible to the receiver 120, in which case the signals from the other satellites visible to the receiver 120 will be eliminated. Such a subset can be chosen in any suitable manner.

In an example, a receiver 120 is configured to concurrently receive signals from satellites in different global navigation satellite systems (GNSSs). That is, the receiver 120 can concurrently receive and calculate a navigation solution based on a signal from a satellite that is part of a first GNSS (e.g., GPS) and on a signal from a second satellite that is a part of a second GNSS (e.g., Galileo). In a particular example, the receiver 120 is configured to concurrently receive signals from satellites in each of the GPS, Galileo, GLONASS and COMPASS GNSSs. In other examples, the receiver 120 can be configured to concurrently receive signals from a different set of GNSSs. In examples where the receiver 120 is configured to concurrently receive signals from satellites in each of the GPS, Galileo, GLONASS and COMPASS GNSSs, the receiver 120 may have about 40 visible satellites. Alternatively, in an example, the receiver 120 is configured to receive signals from satellites in one GNSS exclusively (e.g., exclusively GPS).

As mentioned above, the initial set of N satellites is recursively decreased in number until the number of satellites (N) is equal to a number of satellites from which the receiver 120 is configured to calculate a navigation solution (block 204). To decrease the number of satellites in the set, the receiver 120 selectively eliminates signals from one or more satellites. In particular, the receiver 120 eliminates signals from a number of satellites such that the set of satellites from which the receiver 120 is processing signals is equal to the number of satellites from which the receiver 120 is configured to calculate a navigations solution. As it is desirable to have a good geometry among the satellites remaining after selection, the method 200 selects which satellites will remain in the set and which satellites will be excluded based on criteria, where the criteria depends on achieving a desired outcome, as explained below in the discussion of block 208.

To begin the recursion, the receiver 120 sets the initial set of N satellites as the current set of N satellites (block 206). After each successive loop, however, the receiver 120 sets the reduced set of N satellites as the current set of N satellites.

Once the current set of N satellites is set as either the initial set of N satellites or the reduced set of N satellites, all possible sub-sets of N−P satellites from the set of N satellites is created (block 208). The receiver 120 creates the sub-sets by selectively omitting P satellites from the set of N satellites, where the group of P omitted satellites is a different for each sub-set. In an example, assume N is satellites 102-110 from FIG. 1 and that P=1. In this example, the sub-sets would consist of the following satellites: the first sub-set would be [102, 104, 106, 108]; the second sub-set would be

[102, 104, 106, 110]; the third sub-set would be [102, 104, 108, 110]; the fourth sub-set would be [102, 106, 108, 110]; and the fifth sub-set would be [104, 106, 108, 110]. In another example, P can be greater than 1.

After the sub-sets of N–P satellites are created, the receiver 120 can then evaluate the sub-sets of N–P satellites with respect to one or more criterion (block 208). The one or more criterion can be further divided into one or more first criterion and one or more second criterion. In an example, the one or more criterion can be binary, i.e., whether a sub-set of N–P satellites either does or does not satisfy a requirement or set of requirements. In an example of a criterion that is binary, the criterion can be a threshold or thresholds, i.e., whether a sub-set of N–P satellites results in value or values above or below a threshold or thresholds. For example, the one or more criterion can be one or a combination of the following thresholds: a horizontal position error limit ($HPE_{Lim}$), a vertical position error limit ($VPE_{Lim}$), a vertical protection level limit ($VPL_{Lim}$; alternatively vertical alert limit), a horizontal protection level limit ($HPL_{Lim}$; alternatively horizontal alert limit), or an effective monitor threshold limit ($EMT_{Lim}$). In an example, assume that the criterion is the threshold $VPL_{Lim}$ and the $VPL_{Lim}$ is set to 35 meters (note, however, that the limit can be set to any suitable number or limit). Thus, in this example, the receiver 120 evaluates all the sub-sets of N–P satellites that were created to determine if the absolute value of the vertical protection level (VPL) is below the $VPL_{Lim}$ of 35 meters. In another example, as stated above, the one or more criterion can be a combination of multiple thresholds. For example, assume the one or more criterion is a combination of all of the following thresholds: $HPE_{Lim}$, $VPE_{Lim}$, $VPL_{Lim}$, $HPL_{Lim}$, and $EMT_{Lim}$. Further, assume in this example that the $HPE_{Lim}$ is 16 meters, the $VPE_{Lim}$ is 4 meters, the $VPL_{Lim}$ is 35 meters, the $HPL_{Lim}$ is 40 meters, and the $EMT_{Lim}$ is 15 meters (as discussed above, however, these limits can be set to any suitable number or limit). In this example, the receiver 120 evaluates all the sub-sets of N–P satellites to determine if the absolute value of VPL is below the $VPL_{Lim}$ of 35 meters, the absolute value of horizontal protection level (HPL) is below the $HPL_{Lim}$ of 40 meters, the horizontal position error (HPE) is below the $HPE_{Lim}$ of 16 meters, the vertical position error (VPE) is below the $VPE_{Lim}$ of 4 meters, and the effective monitor threshold (EMT) below the $EMT_{Lim}$ of 15 meters.

In another example, the one or more criterion can be continuous, such as a quantity or set of quantities for which a function of the quantities is either minimized or maximized. For example, the quantity can be the GDOP and the sub-set of N–P satellites that minimizes the GDOP is then selected as the set of N satellites (block 210) for continuing. The GDOP is, however, only vicariously related to the quantities defined in the requirements for the required accuracy and integrity of the navigation information requirements. So, in another example, a set of quantities stemming from the requirements for a particular device and mode of operation might be used to select the N satellites for continuing that is not equivalent to calculating the GDOP. Further, in the examples given above, the set of quantities can be supplemented with one or more weighting parameters. For example, assume that the one criterion is a combination of all the following quantities: HPE, VPE, VPL, HPL, and EMT. The one or more weighting parameters in this example might be used within the criterion as follows: $a_1*(HPE)+a_2*(VPE)+a_3*(HPL)+a_4*(VPL)+a_5*(EMT)$, where $a_1, a_2, a_3, a_4, a_5$ are weighting parameters and the sub-set of N–P satellites that minimizes this criterion is then selected as the set of N satellites (block 210) for continuing. The weighting parameters can be determined a priori based on e.g., the Monte-Carlo simulations in such a way that the most limiting requirement is weighted most. For example, since VPL is usually considered the most stringent requirement in approach operations for an aircraft, it can be weighted the most during those times.

In an example, the one or more criterion can be dynamic. That is, the one or more criterion is not static, but can change as is needed (e.g., if the receiver 120 is an aircraft, the one or more criterion in the examples can change depending on which stage of flight the aircraft is in (i.e., landing, departing, descending, etc.)). For example, if a criterion is binary and dynamic, the criterion can be a threshold or a combination of thresholds at one period of time, and then at another period of time, the criterion is a different threshold or combination of thresholds. In an example, assume that at time to a criterion corresponds to whether the VPL is less than a $VPL_{Lim}$ and then at time $t_1$, the criterion corresponds to whether the HPL is less than a $HPL_{Lim}$. In another example, assume a continuous criterion based on weighting constants and dynamic. That is, assume $a_1, a_2, a_3, a_4$ and $a_5$ are weighting constants and $t_0$ and $t_1$ are two different times, then one or all of the following can be true: $a_1(t_0) \neq a_1(t_1)$, $a_2(t_0) \neq a_2(t_1), a_3(t_0) \neq a_3(t_1), a_4(t_0) \neq a_4(t_1)$. In another example, the one or more criterion could correspond to a combination of thresholds and/or parameters as well as being dynamic.

If only one sub-set of satellites satisfies the one or more (binary) criterion then that sub-set can be selected as the set of N satellites (block 210) for continuing. The selected set of N satellites is then input into the loop (block 204) to further reduce the number N of satellites in the set, if necessary. If more than one sub-set satisfies the one or more binary criterion, however, then the more than one sub-set can be evaluated with respect to another continuous criterion (block 208) in order to select a single sub-set from the more than one sub-sets that satisfies the one or more criterion. The one sub-set that meets the one or more additional criterion (e.g., the sub-set that minimizes or maximizes the one or more additional criterion) is then selected as the set of N satellites (block 210) for continuing. The selected set of N satellites is then input into the loop (block 204) to further reduce the number N of satellites in the set, if necessary. The one or more additional criterion can be any one or a combination of the one or more criterion discussed above. Any criterion discussed above can also be dynamic, i.e., the criterion structure, the quantities and the weighting parameter can all vary in time, depending on, for example, different phases of flight, different performance requirements imposed on a navigation system or navigation information, etc.

As mentioned above, the result of block 210 is a selection of a sub-set of N–P satellites from the set of N satellites input into the loop (blocks 206-210). For the first time through the loop, the set of N satellites input is the initial set of N satellites. Accordingly, the result of the loop is a reduction from the set of N satellites input into the loop to a set of N–P satellites selected in block 210. The selection of the sub-set of N–P satellites from block 210 is then input back into the loop (blocks 204-210) as a new set of N satellites. As described above, the loop will further reduce the number N of satellites in the set until the number of satellites is equal to a number of satellites from which the receiver 120 is configured to calculate a navigation solution. Accordingly, the number N of satellites in the set is smaller for each subsequent time through the loop. If, for a given set of N satellites input into the loop at block 204, N is still greater than the number of satellites from which the receiver 120 is configured to calculate a navigation solution, then the loop is performed again beginning at block 206 above. If, however, for a given set of N satellites input into the loop at block 204, N is equal to (or even less than) the number of satellites from which the receiver 120 is configured to calculate a navigation solution, then the recursive loop (blocks 204-210) is exited and a navigation solution is calculated (block 212). In this manner, an initial set of N satellites can be incrementally reduced to arrive at a number of satellites from which the receiver 120 is configured to calculate a navigation solution in order to calculate a navigation solution. In an example, the number of satellites from which the receiver 120 is configured to calculate a navigation solution is 14 satellites. Thus, the loop continues until the set of N satellites has been reduced to 14 satellites.

Once the number N of satellites in the set is equal to the number of satellites from which the receiver 120 is configured to calculate a navigation solution, a solution is calculated using signals from the set of N satellites (block 212) selected by the immediately previous operation of the loop (blocks 204-214). In an example, a navigation solution can include a position or velocity. Further, the navigation solution can be in the North-East-Down (NED) coordinate system or another earth relative coordinates (e.g., a latitude, longitude, and altitude).

Figure 3:
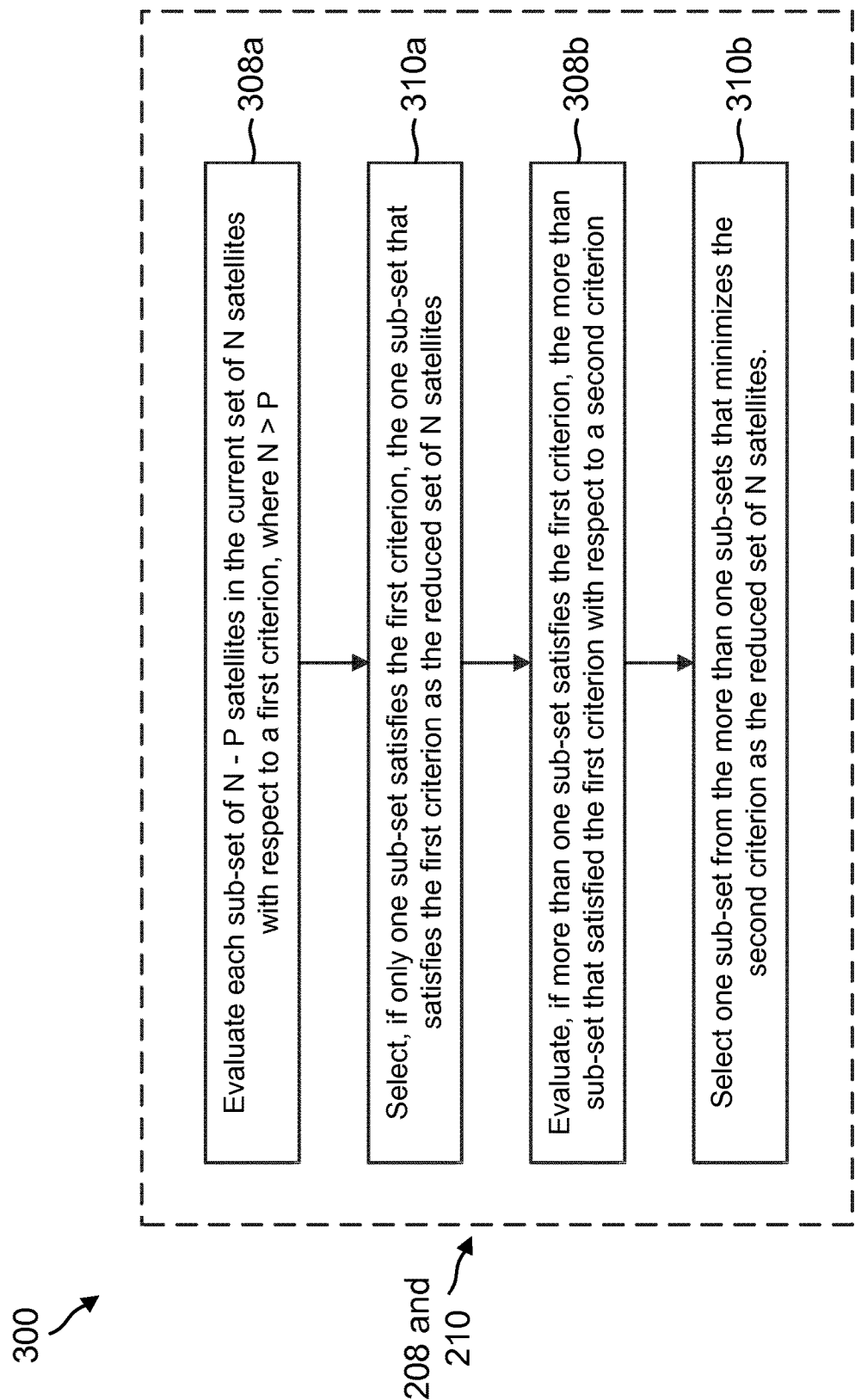
FIG. 3 is a flow diagram of an example of a method for satellite selection from a set of satellites in a navigation system.

FIG. 3 is a flow diagram of a method 300 for separating block 208 into a first and second criterion and selecting one of the sub-sets as the reduced set of N satellites (block 210). That is, after the current set of N satellites is set as the initial set of N satellites or the reduced set of N satellites (block 206), then block 208 includes evaluating each sub-set of N−P satellites in the current set of N satellites with respect to a first criterion (block 308$a$). If only one sub-set satisfies the first criterion, selecting one of the sub-sets in block 210 above includes selecting the one sub-set that satisfies the first criterion as the reduced set of N satellites (310$a$). If more than one sub-set satisfies the first criterion, however, then evaluating each sub-set in block 208 includes evaluating the more than one sub-set that satisfied the first criterion with respect to a second criterion (block 308$b$). And, selecting one of the sub-sets in block 210 includes selecting the one sub-set that minimizes (or maximizes, depending on the criterion function) the second criterion (block 310$b$). After one sub-set of satellites is selected as the reduced set of N satellites (either block 310$a$ or 310$b$), then, unless the reduced of N satellites is equal to the number of satellites from which the receiver 120 is configured to calculate a navigation solution, the method proceeds back to block 204 in FIG. 2 to perform blocks 206-210 again, this time with the reduced set of N satellites. If, however, the reduced of N satellites is equal to the number of satellites from which the receiver 120 is configured to calculate a navigation solution, then the method proceeds to block 212.

In an example, the first criterion can be binary as described with respect to block 208 above. In an example, the first criterion can be a threshold or combination of thresholds as described with respect to block 208 above. In an example, the first criterion can be dynamic and/or binary as described with respect to block 208 above.

In an example, the second criterion can be a function of quantities and a weighting parameter or set of parameters as described with respect to block 208 above. In an example, the second criterion can be dynamic (i.e., time variant) and/or depending on a parameter or set of parameters as described with respect to block 208 above. The quantities can be selected to be a function of the requirements for a given navigation system, platform (e.g., airplane), and operation mode (e.g., phase of flight).

Advantageously, compared to the optimal method for selecting a sub-set of satellites, method 200 can reduce the computational demands on a receiver 120 when selecting a sub-set of satellites. This is particularly true as the number of satellites in the initial set increases. For example, assume that the initial set includes N=20 satellites, and 15(=R) satellites is the number of satellites from which the receiver 120 is configured to calculate a navigation solution. Under previous methods, this could involve 15504 evaluations since every possible sub-set of satellites would be evaluated resulting in $_NC_R=(N!)/(R!*(N-R)!)$ sub-set evaluations, where N=20 and R=15. Under one possible application of the method 200, where N=20, P=1 and the number of satellites from which the receiver 120 is configured to calculate a navigation solution is 15, there would only be 90 sub-set evaluations. Thus, the number of computations required for the receiver 120 is reduced dramatically.

Additionally, using conventional geometry screening techniques that are based on minimizing the GDOP do not necessarily guarantee the minimum values of accuracy and integrity related measures that are the cornerstone requirements for particular phases of flight. Using the above techniques instead, however, may yield better result. Specifically, using the accuracy and integrity related thresholds $HPE_{Lim}$, $VPE_{Lim}$, $VPL_{Lim}$, $HPL_{Lim}$, and $EMT_{Lim}$ and the accuracy and integrity related quantities HPE, VPE, VPL, HPL, and EMT in the first binary criterion and the weighting parameters $a_1$, $a_2$, $a_3$, $a_4$, $a_5$ in the second criterion may yield more accurate results.

EXAMPLE EMBODIMENTS

Example 1 includes a method for satellite selection from a set of satellites in a global navigation satellite system, the method comprising: providing an initial set of N satellites visible to a global navigation satellite system receiver; recursively performing the following until N is equal to a number of satellites from which a receiver is configured to calculate a navigation solution; setting either the initial set of N satellites or a reduced set of N satellites as a current set of N satellites; evaluating each sub-set of N−P satellites in the current set of N satellites with respect to one or more first criterion, where N>P; if only one sub-set satisfies the one or more first criterion, then selecting the one sub-set that satisfies the one or more first criterion as the reduced set of N satellites; if more than one sub-set satisfies the one or more first criterion, then: evaluating each sub-set that satisfies the one or more first criterion with respect to one or more second criterion; and selecting the one sub-set that optimizes the one or more second criterion as the reduced set of N satellites; and calculating a navigation solution using signals from the reduced set of N satellites once N is equal to the number of satellites from which the receiver is configured to calculate a navigation solution.

Example 2 includes the method of Example 1, wherein the one or more first criterion is binary.

Example 3 includes the method of Example 2, wherein the one or more first criterion is a function of a threshold or a combination of thresholds.

Example 4 includes the method of any of Examples 1-3, wherein the one or more second criterion is a function of quantities characterizing the performance of a navigation system and a parameter or set of parameters.

Example 5 includes the method of Example 4, wherein the parameter or set of parameters are weighting parameters.

Example 6 includes the method of any of Examples 1-5, wherein the one or more first criterion is dynamic (i.e., changing in time).

Example 7 includes the method of any of Examples 1-6, wherein the one or more second criterion is dynamic (i.e., changing in time).

Example 8 includes the method of any of Examples 1-7, wherein the initial set of N satellites includes all satellites visible to the global navigation satellite system receiver.

Example 9 includes the method of any of Examples 1-8, wherein P=1.

Example 10 includes a satellite navigation system receiver comprising: one or more processing devices; one or more memory devices coupled to the one or more processing devices and including instructions which, when executed by the one or more processing devices, cause the one or more processing devices to: receive a signal from an initial set of N satellites; recursively perform the following until N is equal to a number of satellites from which the receiver is configured to calculate a navigation solution; set either the initial set of N satellites or a reduced set of N satellites as a current set of N satellites; evaluate each sub-set of N–P satellites in the current set of N satellites with respect to one or more first criterion, where N>P; if only one sub-set satisfies the one or more first criterion, select the one sub-set that satisfies the one or more first criterion as the reduced set of N satellites; if more than one sub-set satisfies the one or more first criterion, then: evaluate each sub-set that satisfied the one or more first criterion with respect to one or more second criterion; and select the one sub-set that optimizes the one or more second criterion as the reduced set of N satellites; and calculate a navigation solution using signals from the reduced set of N satellites once N is equal to the number of satellites from which the receiver is configured to calculate a navigation solution.

Example 11 includes the satellite navigation system receiver of Example 10, wherein the one or more first criterion is binary.

Example 12 includes the satellite navigation system receiver of Example 11, wherein the one or more first criterion is a function of a threshold or combination of thresholds.

Example 13 includes the satellite navigation system receiver of any of Examples 10-12, wherein the one or more second criterion is a function of quantities characterizing the performance of a navigation system and a parameter or set of parameters.

Example 14 includes the satellite navigation system receiver of Example 13, wherein the parameter or set of parameters are weighting parameters.

Example 15 includes the satellite navigation system receiver of any of Examples 10-14, wherein the one or more first criterion is dynamic (i.e., changing in time).

Example 16 includes the satellite navigation system receiver of any of Examples 10-15, wherein the one or more second criterion is dynamic (i.e., changing in time).

Example 17 includes the satellite navigation system receiver of any of Examples 10-16, wherein the initial set of N satellites includes all satellites visible to the satellite navigation system receiver.

Example 18 includes the satellite navigation system receiver of any of Examples 10-16, wherein P=1.

Example 19 includes a method for satellite selection from a set of satellites in a global navigation satellite system, the method comprising: providing an initial set of N satellites visible to a global navigation satellite system receiver; recursively performing the following until N is equal to a number of satellites from which a receiver is configured to calculate a navigation solution; setting either the initial set of N satellites or the reduced set of N satellites as the current set of N satellites evaluating each sub-set of N–1 satellites in the current set of N satellites with respect a first criterion, wherein the first criterion is satisfied if all of the following are true: the absolute value of a horizontal position error (HPE) is less than a horizontal position error limit ($HPE_{Lim}$); the absolute value of a vertical position error (VPE) is less than a vertical position error limit ($VPE_{Lim}$); the absolute value of a horizontal protection level (HPL) is less than a horizontal protection level limit ($HPL_{Lim}$); the absolute value of a vertical protection level (VPL)) is less than a vertical protection level limit ($VPL_{Lim}$); and the absolute value of an effective monitor threshold (EMT) is less than an effective monitoring threshold limit ($EMT_{Lim}$); if only one sub-set satisfies the first criterion, selecting the one sub-set that satisfies the first criterion as the reduced set of N satellites; if more than one sub-set satisfies the first criterion, then: evaluating the more than one sub-set that satisfied the first criterion with respect to a second criterion=$a_1$*(HPE)+$a_2$*(VPE)+$a_3$*(HPL)+$a_4$*(VPL)+$a_5$*(EMT), where $a_1$, $a_2$, $a_3$, $a_4$, $a_5$ are weighting parameters; and selecting as the reduced set of N satellites, the sub-set from the more than one sub-sets that minimizes the second criterion.

Example 20 includes the method of Example 19, wherein $a_1(t_0) \neq a_1(t_1)$, $a_2(t_0) \neq a_2(t_1)$, $a_3(t_0) \neq a_3(t_1)$, $a_4(t_0) \neq a_4(t_1)$, and $a_5(t_0) \neq a_5(t_1)$, where $t_0$, $t_1$ are two different stages of a flight.

What is claimed is:

1. A method for satellite selection from a set of satellites in a global navigation satellite system, the method comprising:
   receiving signals from an initial set of N satellites visible to a global navigation satellite system receiver;
   setting a current set of satellites equal to the initial set of N satellites, wherein the size of the current set of satellites is denoted S;
   recursively performing the following steps until the size S of the current set of satellites has been reduced to M, where M is equal to a number of satellites from which a receiver is configured to calculate a navigation solution:
      selectively omitting P satellites from the current set of S satellites to create sub-sets of S–P satellites of the current set of S satellites, wherein P>0 and P<=(N–M);
      evaluating each sub-set of S–P satellites in the current set of S satellites with respect to one or more first criterion;
      if only one sub-set satisfies the one or more first criterion, then setting the one sub-set that satisfies the one or more first criterion as the current set of satellites;
      if more than one sub-set satisfies the one or more first criterion, then:
         evaluating each sub-set that satisfies the one or more first criterion with respect to one or more second criterion; and
         setting the one sub-set that optimizes the one or more second criterion as the current set of satellites; and
   calculating a navigation solution using signals from the current set of satellites that results from performing the preceding steps, wherein the size of the current set is equal to M.

2. The method of claim 1, wherein the one or more first criterion is binary.

3. The method of claim 2, wherein the one or more first criterion is a function of a threshold or a combination of thresholds.

4. The method of claim 1, wherein the one or more second criterion is a function of quantities characterizing the performance of a navigation system and a parameter or set of parameters.

5. The method of claim 4, wherein the parameter or set of parameters are weighting parameters.

6. The method of claim 1, wherein the one or more first criterion is dynamic (i.e., changing in time).

7. The method of claim 1, wherein the one or more second criterion is dynamic (i.e., changing in time).

8. The method of claim 1, wherein the initial set of N satellites includes all satellites visible to the global navigation satellite system receiver.

9. The method of claim 1, wherein P=1.

10. A satellite navigation system receiver comprising:
one or more processing devices;
one or more memory devices coupled to the one or more processing devices and including instructions which, when executed by the one or more processing devices, cause the one or more processing devices to:
receive signals from an initial set of N satellites, wherein the size of the current set of satellites is denoted S;
recursively perform the following until the size of S of the current set of satellites is reduced to M, where M is equal to a number of satellites from which the receiver is configured to calculate a navigation solution:
selectively omitting P satellites from the current set of S satellites to create sub-sets of S–P satellites of the current set of S satellites, each sub-set of S–P satellites containing less satellites than the current set of S satellites, further wherein P>0 and P<= (N–M);
evaluate each sub-set of S–P satellites in the current set of S satellites with respect to one or more first criterion;
if only one sub-set satisfies the one or more first criterion, setting the one sub-set that satisfies the one or more first criterion as a reduced set of satellites;
if more than one sub-set satisfies the one or more first criterion, then:
evaluate each sub-set that satisfied the one or more first criterion with respect to one or more second criterion; and
select the one sub-set that optimizes the one or more second criterion as the reduced set of satellites; and
calculate a navigation solution using signals from the reduced set of satellites once the reduced set of satellites is equal to M.

11. The satellite navigation system receiver of claim 10, wherein the one or more first criterion is binary.

12. The satellite navigation system receiver of claim 11, wherein the one or more first criterion is a function of a threshold or combination of thresholds.

13. The satellite navigation system receiver of claim 10, wherein the one or more second criterion is a function of quantities characterizing the performance of a navigation system and a parameter or set of parameters.

14. The satellite navigation system receiver of claim 13, wherein the parameter or set of parameters are weighting parameters.

15. The satellite navigation system receiver of claim 10, wherein the one or more first criterion is dynamic (i.e., changing in time).

16. The satellite navigation system receiver of claim 10, wherein the one or more second criterion is dynamic (i.e., changing in time).

17. The satellite navigation system receiver of claim 10, wherein the initial set of N satellites includes all satellites visible to the satellite navigation system receiver.

18. The satellite navigation system receiver of claim 10, wherein P=1.

19. A method for satellite selection from a set of satellites in a global navigation satellite system, the method comprising:
receiving signals from an initial set of N satellites visible to a global navigation satellite system receiver;
setting a current set of satellites equal to the initial set of N satellites, wherein the size of the current set of satellites is denoted S;
recursively performing the following steps until the size S of the current set of satellites has been reduced to M, where M is equal to a number of satellites from which a receiver is configured to calculate a navigation solution:
selectively omitting one satellite from the current set of S satellites to create sub-sets of S–1 satellites of the current set of S satellites;
evaluating each sub-set of S–1 satellites in the current set of S satellites with respect to a first criterion, wherein the first criterion is satisfied if all of the following are true:
the absolute value of a horizontal position error (HPE) is less than a horizontal position error limit ($HPE_{Lim}$);
the absolute value of a vertical position error (VPE) is less than a vertical position error limit ($VPE_{Lim}$);
the absolute value of a horizontal protection level (HPL) is less than a horizontal protection level limit ($HPL_{Lim}$);
the absolute value of a vertical protection level (VPL)) is less than a vertical protection level limit ($VPL_{Lim}$); and
the absolute value of an effective monitor threshold (EMT) is less than an effective monitoring threshold limit ($EMT_{Lim}$);
if only one sub-set satisfies the first criterion, selecting the one sub-set that satisfies the first criterion as a reduced set of S satellites;
if more than one sub-set satisfies the first criterion, then:
evaluating the more than one sub-set that satisfied the first criterion with respect to a second criterion=$a_1$*(HPE)+$a_2$*(VPE)+$a_3$*(HPL)+$a_4$*(VPL)+$a_5$*(EMT), where $a_1$, $a_2$, $a_3$, $a_4$, $a_5$ are weighting parameters; and
selecting as the reduced set of S satellites, the sub-set from the more than one sub-sets that minimizes the second criterion.

20. The method of claim 19, wherein $a_1(t_0) \neq a_2(t_0) \neq a_3(t_0) \neq a_3(t_1)$, $a_4(t_0) \neq a_4(t_1)$, and $a_5(t_0) \neq a_5(t_1)$, where $t_0$, $t_1$ are two different stages of a flight.

* * * * *

UNITED STATES PATENT AND TRADEMARK OFFICE
CERTIFICATE OF CORRECTION

PATENT NO. : 9,766,346 B2  
APPLICATION NO. : 14/091441  
DATED : September 19, 2017  
INVENTOR(S) : Dunik et al.

Page 1 of 1

It is certified that error appears in the above-identified patent and that said Letters Patent is hereby corrected as shown below:

In the Claims

Starting at Column 12, Line 63 to Line 64, please replace:
"$a_1(t_0) \neq a_2(t_0) \neq a_3(t_0) \neq a_3(t_1), a_4(t_0) \neq a_4(t_1),$ and $a_5(t_0) \neq a_5(t_1)$"
With:
--$a_1(t_0) \neq a_1(t_1), a_2(t_0) \neq a_2(t_1), a_3(t_0) \neq a_3(t_1), a_4(t_0) \neq a_4(t_1),$ and $a_5(t_0) \neq a_5(t_1)$--.

Signed and Sealed this  
Twenty-eighth Day of May, 2019

Andrei Iancu  
*Director of the United States Patent and Trademark Office*